United States Patent [19]

Neroni et al.

[11] 4,064,355
[45] Dec. 20, 1977

[54] POLYMERIC FLEXIBLE HOSE CONSTRUCTION AND METHOD OF MAKING SAME

[75] Inventors: Peter J. Neroni, Dayton; Donald L. Kleykamp, Springboro, both of Ohio

[73] Assignee: Dayco Corporation, Dayton, Ohio

[21] Appl. No.: 739,874

[22] Filed: Nov. 8, 1976

[51] Int. Cl.² ............................................. F16L 11/12
[52] U.S. Cl. ...................................... 174/47; 138/115; 138/122; 428/36; 264/172
[58] Field of Search ................ 428/36; 174/47, 15 C, 174/97; 138/103, 121, 122, 115; 264/172, DIG. 52

[56] References Cited

U.S. PATENT DOCUMENTS

| 2,923,954 | 2/1960 | Babcock | 174/47 |
| 3,082,289 | 3/1963 | Allen | 174/47 |
| 3,367,370 | 2/1968 | Sherlock | 174/47 |
| 3,715,454 | 2/1973 | Klegkamp | 174/47 |
| 3,725,178 | 4/1973 | Klegkamp et al. | 156/244 |
| 3,929,957 | 12/1975 | Holden et al. | 264/172 |

FOREIGN PATENT DOCUMENTS

| 1,176,765 | 1/1970 | United Kingdom | 174/47 |

Primary Examiner—William R. Dixon, Jr.
Attorney, Agent, or Firm—Reuben Wolk

[57] ABSTRACT

A polymeric flexible hose construction and method of making same are provided wherein such hose construction comprises a tubular wall defining a main longitudinally extending passage for conveying a fluid therethrough and a second wall adjoining the tubular wall and defining a second longitudinally extending passage for an electrical conductor with the second wall having a wall portion common with the tubular wall.

8 Claims, 8 Drawing Figures

POLYMERIC FLEXIBLE HOSE CONSTRUCTION AND METHOD OF MAKING SAME

BACKGROUND OF THE INVENTION

In a tank or canister type vacuum cleaner a flexible hose construction is usually employed and is connected to the tank of the vacuum cleaner at one end and to a rotatable cleaning brush, or the like, at the other end which is powered by an electric motor whereby it is necessary to provide an electrical conductor with the hose construction for conveying electricity along the length thereof. In addition, it is necessary to make such a vacuum cleaner hose construction which is capable of operating in a non-collapsing manner while keeping the electrical conductor in a protected area.

Because of the substantial market for vacuum cleaner hose constructions of the character mentioned there is keen competition to produce such a hose construction at minimum cost.

SUMMARY

It is a feature of this invention to provide a simple, economical, and highly flexible hose construction which is particularly adapted to be used with tank-type vacuum cleaners.

Another feature of this invention is to provide a hose construction of the character mentioned as a single piece construction which has a plurality of longitudinally extending passages, one of which is for conveying air and particles or objects picked up during vacuum cleaning action and the other of which is for carrying an electrical conductor, or the like.

Another feature of this invention is to provide a polymeric hose construction having a tubular wall defining a main longitudinally extending passage for conveying a fluid therethrough and having a second wall adjoining the tubular wall and defining a second longitudinally extending passage for electrical conductors with the second wall having a wall portion common with the tubular wall.

Another feature of this invention is to provide a polymeric hose construction of the character mentioned having a convoluted tubular wall which is reinforced by a helical reinforcing member.

Another feature of this invention is to provide a simple and economical method of making a hose construction of the character mentioned.

Accordingly, it is an object of this invention to provide a hose construction and method of making same having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 5:
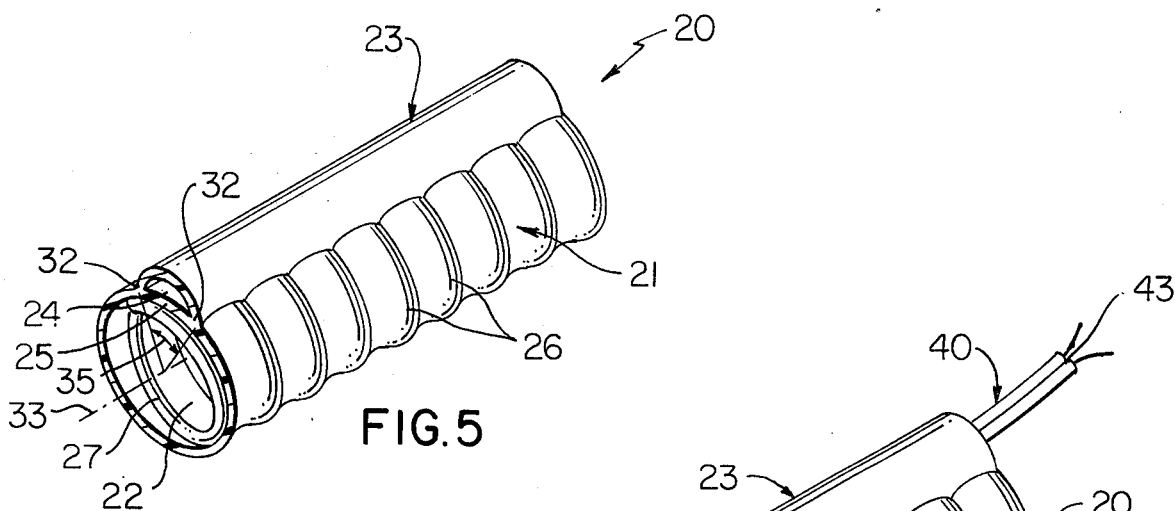
FIG. 5 is a fragmentary perspective view illustrating the hose construction of this invention minus an electrical conductor carried thereby.

Reference is now made to FIG. 5 of the drawings which illustrates one exemplary embodiment of a polymeric flexible hose construction of this invention which is designated generally by the reference numeral 20 and such hose construction 20 is made utilizing the method of this invention which will be described in detail subsequently. The hose construction 20 is particularly adapted to be used as a vacuum cleaner hose and has a plurality of longitudinally extending passages defined in a single piece of polymeric material.

The hose construction 20 comprises a tubular wall 21 defining a main longitudinally extending passage 22 for conveying a fluid such as air containing particles or objects picked up by vacuum action; and, such hose construction has wall means 23 adjoining the tubular wall 21 and defining a second longitudinally extending passage 24 for electrical conductor means, to be subsequently described, and the wall means 23 has a wall portion 25 which is common with the tubular wall 21.

Figure 4:
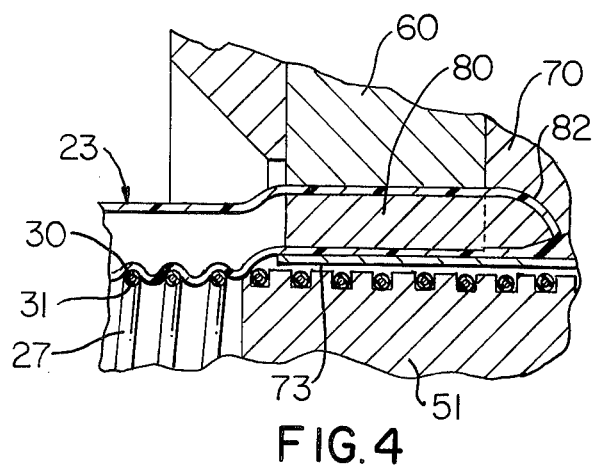
FIG. 4 is a fragmentary cross-sectional view particularly illustrating the forming of the hose construction of this invention at the discharge end portion of the apparatus of FIG. 2.

The tubular wall 21 of the hose construction 20 has a plurality of convolutions a representative few of which are designated by the same reference numeral 26 and such convolutions are defined by a continuous longitudinally extending helical convolution also designated by the reference numeral 26. The hose construction 20 also has a reinforcing member which is in the form of a continuous helical member 27 which is disposed within the continuous helical convolution of the tubular wall 21. The helical reinforcing member 27 of this example is comprised of a central metal wire 30, see FIG. 4, which has a plastic sleeve or coating 31 therearound and the sleeve 31 may be made of a material compatible with the material used to make wall 21 so as to provide a tenacious bond between member 27 and wall 21.

The tubular wall 21 and wall means 23 are a single-piece construction and are of substantially uniform wall thickness throughout. In particular, the wall means 23 is a C-shaped wall, i.e. of substantially C-shaped cross-sectional configuration, having end edges each designated by the same reference numeral 32 adjoining the tubular wall along the full length thereof and with the common wall portion 25 being disposed between the end edges 32.

The unflexed or unbent tubular wall 21 has a central longitudinal axis 33 and the passage 24, defined by the C-shaped wall 23 and common wall portion 25, is disposed in a substantially rectilinear path parallel to the longitudinal axis 33 of the tubular wall 21. The C-shaped wall 23 is a substantially straight approximately semicylindrical wall, free of convolutions, and when viewing the hose construction 20 in cross section such wall and common wall portion 25 extend along the periphery of tubular wall 21 through an arc which is a small fractional part of the circumference or periphery of the tubular wall 21 and such arc is indicated at 35 and is preferably less than 90°.

Figure 6:
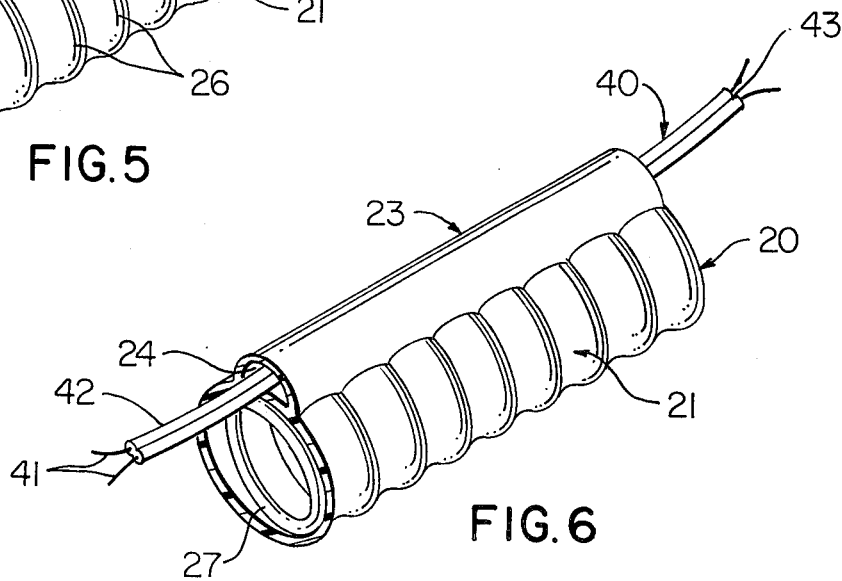
FIG. 6 is a view similar to FIG. 5 illustrating the hose construction of this invention with an electrical conductor disposed in its electrical conductor carrying passage.

The hose construction 20 is particularly adapted to have electrical conductor means in the form of an electrical conductor 40 disposed concentrically within the passage 24 and the conductor 40 of this example of the invention is comprised of two electrical conductors 41 each insulated with suitable electrical insulating material or sleeve 42 defining two sleeves which are bonded together at an interface 43, see FIG. 6.

The hose construction 20 with its reinforcing helical member 27 may be made utilizing any suitable technique known in the art; however, such hose construction is preferably made utilizing the apparatus and method illustrated in FIGS. 1-4 of the drawings. In particular, what is referred to as a non-rotating helical member 27 is provided as shown at 45 in FIG. 1 and such reinforcing member may be made using any technique known in the art and preferably utilizing the apparatus disclosed in U.S. Pat. No. 3,725,178.

The helical reinforcing member 27 is moved through an extruder head 50 by an elongated rotatable feed screw 51 having a length which coincides roughly with the length of the extruder head 50. The screw has a single external helical groove 52 provided therein and the groove 52 has a depth which corresponds to the diameter of the reinforcing member 27 and a pitch which corresponds to the pitch of the non-rotating member 27 so that the member 27 is received within the groove 52 and is moved axially through the extruder head 50 in a non-rotating manner simply by rotating the screw 51. The screw 51 has a sheave 54 suitably fixed thereto and the sheave 54 is driven by a belt 55 which is in turn driven by a motor 56.

Figure 2:
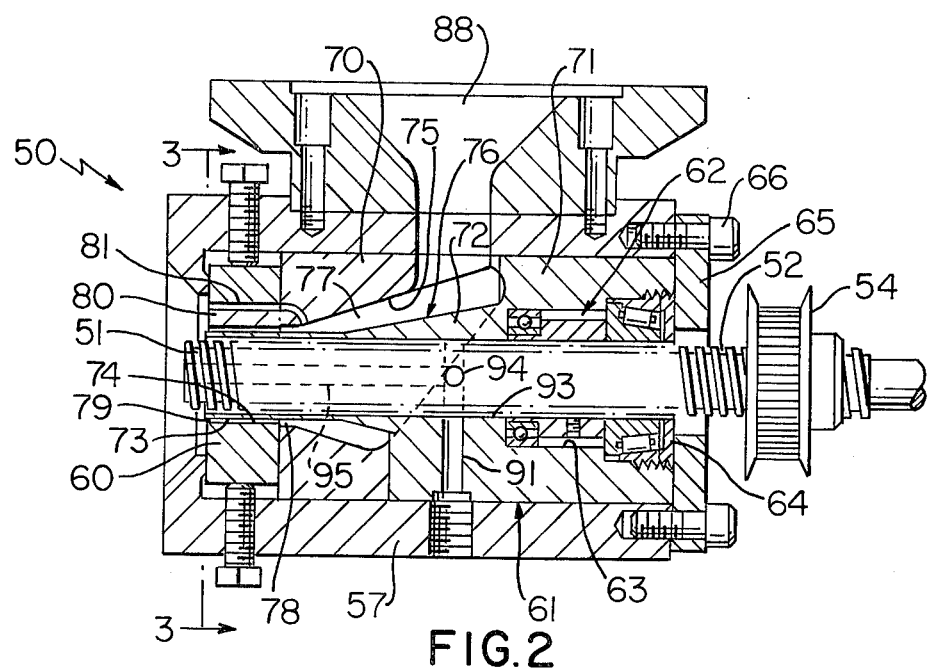
FIG. 2 is an enlarged cross-sectional view taken essentially on the line 2—2 of FIG. 1 showing an extrusion apparatus and method for defining the hose construction of this invention which is a single-piece polymeric construction having a pair of longitudinally extending passages.
Figure 3:
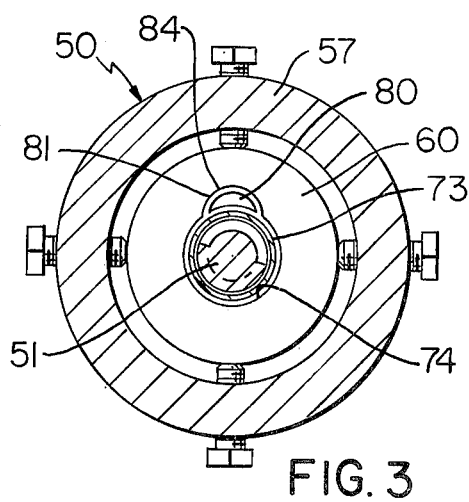
FIG. 3 is a view taken essentially on the line 3—3 of FIG. 2.

As seen in FIG. 2, the extruder head 50 has an outer housing 57 which houses an extrusion die 60 at the discharge end thereof and a cartridge-like die insert assembly 61 at the upstream portion of the housing 57. The insert assembly 61 has a ball bearing assembly 62 suitably supported within a recess 63 thereof and the ball bearing assembly is fixed within recess 63 by an annular threaded fitting 64 while the screw 51 is suitably fixed to the inner races of the ball bearing of the assembly 62. The insert assembly 61 (and thus screw 51 detachably fixed thereto) is held within the housing 57 by an annular plate 65 which is fixed to the housing 57 by threaded metal screws 66.

The insert assembly 61 has a forward portion 70 and a rear portion 71 and the rear portion comprises an intermediate portion 72 terminating in a tubular extension 73 which extends through an inside surface 74 defining a corresponding bore in the die 60. The forward portion 70 of assembly 61 has an inside surface 75 therein which cooperates with exposed surface portions 76 of rear portion 71 of the assembly 61 such that the forward portion 70 and rear portion 71 cooperate to define a passage 77 terminating in a substantially right circular cylindrical annular passage 78. The passage 78 communicates with a right circular cylindrical tubular passage defined by the outside surface of extension 73, the lower part of inside surface 74, and the bottom surface of a projecting rod portion 80 which projects from forward portion 70 to define a right circular cylindrical extrusion orifice 79 at the downstream surface of die 60 which defines the tubular wall 21 of hose construction 20.

The forward portion 70 of insert assembly 61 has the above mentioned projecting rod portion 80 and portion 80 has a D-shaped cross-sectional outline and extends over orifice 79 and cooperates with a substantially semicylindrical surface portion 84 (which comprises the top part of surface 74) in the die 60 to define a substantially C-shaped passage 81 over the orifice 79.

The C-shaped passage 81 defines a polymeric extrusion or wall means 32 of corresponding C-shaped outline having open end edges 32 which bond in a heat fused manner to the tubular wall 21 and C-shaped wall 23. The C-shaped passage 81 is supplied with polymeric material from a passage 82 in portion 70 and passage 82 communicates with tapered passage 77.

The extruder head 50 may be fed from any suitable source providing a suitable hot molten polymeric material in a flowable condition; and, in this example of the invention molten polymeric material is provided through an extrusion apparatus 85 which has a feed screw 86 which is driven by an electric motor 87 through suitable drive connection 80. The polymeric material from apparatus 85 flows through a passage 88 communicating such apparatus with tapered passage 77 of the extruder head 50 to define the hose construction 20 having main tubular portion 21 and semicylindrical (C-shaped cross section) wall portion 23 with common wall 25 therebetween.

Figure 1:
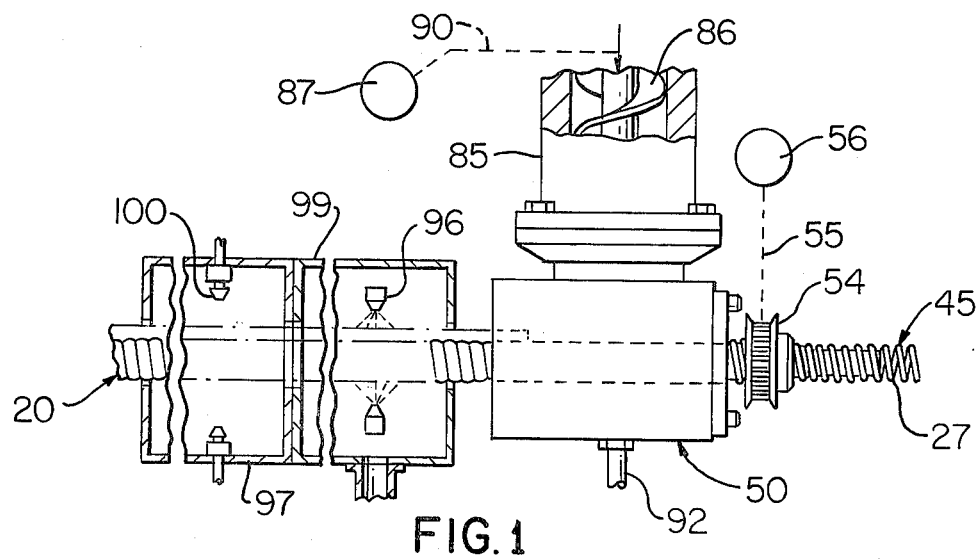
FIG. 1 is a view with parts in cross section, parts in elevation, parts shown schematically, and parts broken away illustrating an apparatus and method employed in making the hose construction of this invention.

The extruder head 50 has a radially extending passage 91 formed in the housing 57 and insert assembly 61 and passage 91 is connected by a line 92, see FIG. 1, to a suitable vacuum source (not shown) to provide some vacuum forming of the molten polymeric material defining tubular wall 21. The passage 91 extends radially inwardly to a central bore 93 in the assembly 61 which receives the screw 51 therethrough. The screw 51 has radially extending ports 94 extending therethrough which communicate with an axial passage 95 through the screw 51 to the terminal end thereof disposed outwardly of die 60. The passages 95, 94, and 91 provide a continuous flow path from the area at the discharge end of the extrusion die 60 to the vacuum source connected to line 92.

The reinforcing member 27 is fed through the extruder head 50 by the rotating screw 51 as previously mentioned whereupon the polymeric tubular wall also designated by the reference numeral 21 is extruded concentrically and in overlying relation against the helical member 27. The extruded polymeric material is reduced or shrunk inwardly by a vacuum created through the passages 95, 94, and 91 thereby defining convolutions 26 in the tubular wall 21. The molten polymeric material defining tubular wall 21 is simultaneously bonded to the plastic sleeve 31 of member 27. It will also be appreciated that as the tubular wall 21 is defined by the method and apparatus of FIG. 2, the C-shaped wall 23 is also simultaneously extruded and its end edges bonded against the tubular wall 23.

In defining the hose construction 20 the movement of the reinforcing member 27 through the extruder head 50 and the rate of feed of polymeric material by the feed screw 86 are controlled by motors 56 and 87 in a cooperating manner. The hose construction 20 thus defined is then suitably moved through a cooling device 99, see FIG. 1, where spray nozzles 96 direct a cooling fluid such as water against such hose construction. The hose construction 20 is then passed through a drying chamber 97 which has a plurality of nozzles 100 which direct hot air thereagainst drying same.

Once the hose construction 20 exits the drying chamber 97, it may be cut into desired lengths or rolled in coil form to define a supply roll thereof. The hose construction 20 may then have electrical means in the form of an electrical conductor 40 inserted through its passage 24 by manual or other suitable means.

Figure 7:
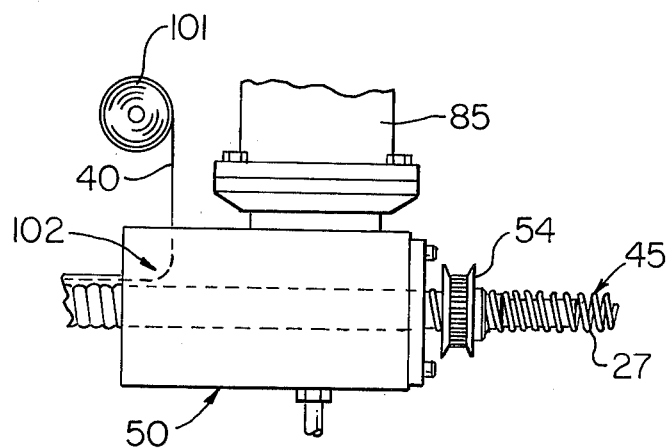
FIG. 7 is a view similar to the central portion of FIG. 1 schematically illustrating the manner in which an electrical conductor may be simultaneously disposed within an electrical conductor carrying passage during the process of forming the hose construction by extrusion process.
Figure 8:
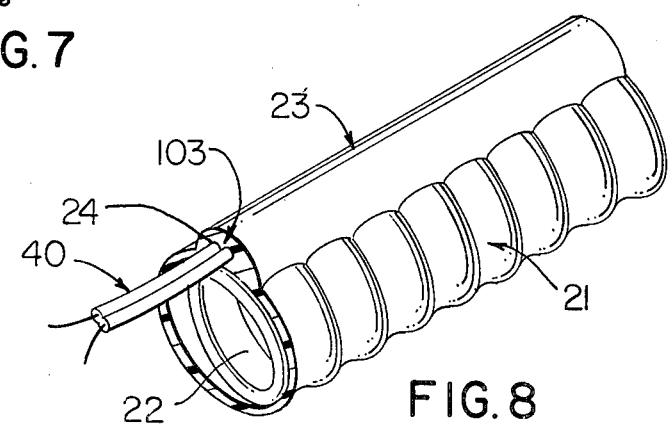
FIG. 8 is a view similar to FIG. 6 showing the hose construction as formed by the apparatus and method disclosed in FIG. 7.

Electrical conductor means in the form of an insulated electrical conductor may be provided in the passage 24 simultaneously with the formation thereof as shown in FIG. 7 of the drawings. In particular, it will be seen that an electrical conductor 40 may be supported for unwinding rotation on a suitable oil 101 thereof and fed through the extruder head 50 as shown at 102 so that it is introduced into the passage 24. Initially, it will be appreciated that a leading end portion of an electrical conductor 40 may be suitably attached to the semicylindrical or C-shaped wall 23 defining the passage 24. After such initial attachment the formation of the hose construction 20 is continued in the detailed manner described above thereby simultaneously forming the two compartment or two passage hose construction 20 defined by main passage 22 and passage 24. In this embodiment, the passage 24 may be formed with a smaller cross-sectional area and greater wall thickness so that the conductor 40 is surrounded comparatively snugly by wall 23 as shown at 103.

While present exemplary embodiments of this invention and methods of practicing the same, have been illustrated and described, it will be recognized that this invention may be otherwise variously embodied and practiced within the scope of the following claims.

What is claimed is:

1. A polymeric flexible hose construction comprising, a tubular wall defining a main longitudinally extending passage for conveying a fluid therethrough, said tubular wall having a central longitudinal axis and having a plurality of convolutions therein defined by a continuous longitudinally extending helical convolution, a helical reinforcing member disposed within said helical convolution, and wall means adjoining the exterior of said tubular wall and defining a second longitudinally extending tubular passage for electrical conductor means, said second tubular passage being disposed substantially parallel to said central longitudinal axis, said wall means having a wall portion common with said tubular wall.

2. A hose construction as set forth in claim 1 in which said reinforcing member comprises a metal wire having a plastic sleeve disposed therearound.

3. A hose construction as set forth in claim 1 in which said tubular wall and wall means are made as a single piece construction.

4. A hose construction as set forth in claim 3 in which said wall means defining said second tubular passage comprises a wall of substantially C-shaped cross-sectional configuration defined by a bight having open end edges adjoining said tubular wall along the full length thereof, said common wall portion being disposed between the ends of said C-shaped wall.

5. A hose construction as set forth in claim 4 in which said tubular wall, C-shaped wall, and common wall portion are of substantially uniform thickness throughout.

6. A hose construction as set forth in claim 1 and further comprising an electrical conductor disposed within said second passage.

7. A hose construction as set forth in claim 6 in which said electrical conductor comprises a plurality of electrically insulated metal wires.

8. A hose construction as set forth in claim 7 in which said second tubular passage has a substantially D-shaped cross-sectional configuration, said D-shaped configuration having an area which is substantially greater than a cross-sectional area through said electrical conductor.

* * * * *